United States Patent
Cleavenger, II et al.

(10) Patent No.: US 11,472,674 B2
(45) Date of Patent: Oct. 18, 2022

(54) LIFTING CLAMP INCLUDING PIVOT LEG

(71) Applicant: Laitram, L.L.C., Harahan, LA (US)

(72) Inventors: John F. Cleavenger, II, Westwego, LA (US); William C. Selsor, Jr., New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 386 days.

(21) Appl. No.: 16/794,497

(22) Filed: Feb. 19, 2020

(65) Prior Publication Data

US 2020/0277167 A1 Sep. 3, 2020

Related U.S. Application Data

(60) Provisional application No. 62/811,908, filed on Feb. 28, 2019.

(51) Int. Cl.
| | |
|---|---|
| *B66C 1/26* | (2006.01) |
| *B66F 9/18* | (2006.01) |
| *F16B 45/02* | (2006.01) |
| *B66C 1/64* | (2006.01) |

(52) U.S. Cl.
CPC .................. *B66C 1/26* (2013.01); *B66C 1/64* (2013.01); *B66F 9/18* (2013.01); *F16B 45/02* (2013.01); *F16B 45/033* (2021.05)

(58) Field of Classification Search
CPC ...... F16B 45/02; F16B 45/033; F16B 45/023; F16B 45/031; B66C 1/64; B66C 1/442
See application file for complete search history.

(56) References Cited

U.S. PATENT DOCUMENTS

| | | | | |
|---|---|---|---|---|
| 2,324,361 | A | * 7/1943 | Chandler | ................... B66C 1/64 294/104 |
| 2,360,601 | A | * 10/1944 | Waldrup | ................... B66C 1/48 294/104 |
| 3,162,476 | A | * 12/1964 | Renfroe | ................... B66C 1/64 294/104 |
| 3,356,406 | A | 12/1967 | Renfroe | |
| 3,659,890 | A | 5/1972 | Renfroe | |
| 3,857,600 | A | 12/1974 | Hasegawa | |
| 4,113,298 | A | 9/1978 | Kopp | |
| 4,145,795 | A | * 3/1979 | Henry | ..................... B63B 21/58 24/599.9 |
| 4,162,804 | A | 7/1979 | Davies | |
| 4,327,944 | A | 5/1982 | Langloy | |
| 4,491,358 | A | 1/1985 | Choung | |
| 4,492,401 | A | 1/1985 | Renfroe et al. | |
| 4,498,699 | A | 2/1985 | Davies | |
| 4,647,098 | A | 3/1987 | Hoyer et al. | |
| 4,702,508 | A | 10/1987 | Weiner et al. | |
| 4,834,442 | A | 5/1989 | Choung | |
| 4,884,836 | A | 12/1989 | Maye et al. | |
| 7,819,448 | B2 | 10/2010 | Bates | |
| 8,186,732 | B2 | 5/2012 | Gillesse | |
| 2012/0134773 | A1 | 5/2012 | Gillesse et al. | |

\* cited by examiner

*Primary Examiner* — Robert Sandy
(74) *Attorney, Agent, or Firm* — Catherine M. Bishop

(57) ABSTRACT

A lifting clamp for an object comprises a plurality of plates stacked and connected together to form seat for a portion of the object, a lifting portion for connecting to a crane or other machine, a pivot leg pivotally connected to the stacked plates for opening the seat, and a lock for selectively locking the pivot leg in a clamped position whereby it grips the object.

16 Claims, 7 Drawing Sheets

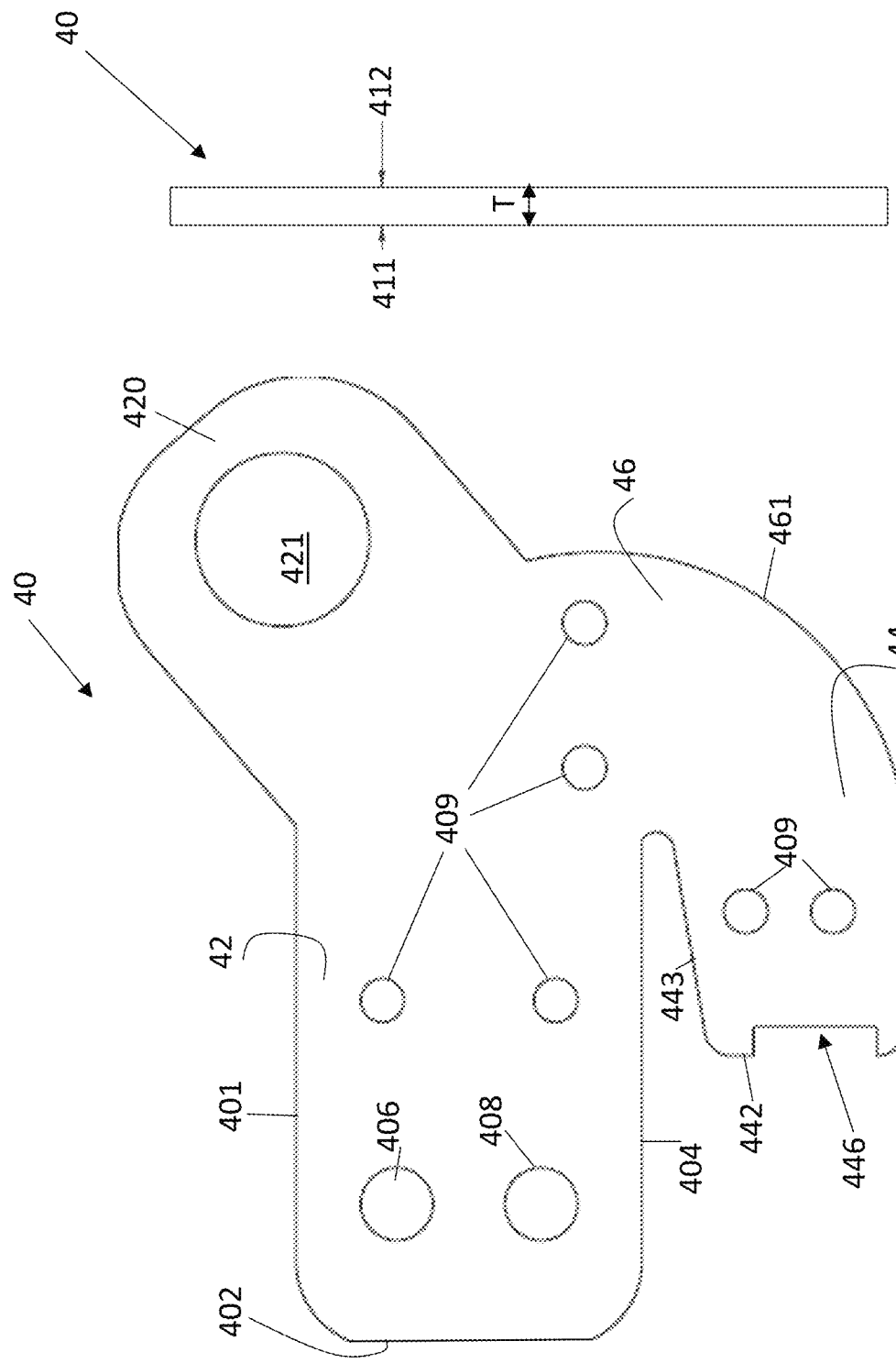

LIFTING CLAMP INCLUDING PIVOT LEG

FIELD OF THE INVENTION

The present invention relates a clamping device used to lift an object.

BACKGROUND OF THE INVENTION

Loading and unloading devices, such as cranes and lifting gear for lifting, transferring and positioning various structural shapes, employ lifting clamps for holding the structure being manipulated. Current lifting clamps are heavy and cumbersome.

SUMMARY OF THE INVENTION

A lifting clamp comprises a plurality of machined plates stacked and connected together to form seat for a portion of the object being lifted, a lifting portion for connecting to a crane or other machine, a pivot leg pivotally connected to the stacked plates for opening the seat, and a lock for selectively locking the pivot leg in a clamped position whereby it grips the object.

According to one aspect, a clamp for clamping an object comprises a first plate comprising a first leg, a second leg separated from the first leg by a first slot, a first pivot pin opening in the first leg, a second plate adjacent an inner face of the first exterior plate, comprising a third leg and a fourth leg separated from the third leg by a second slot that is aligned with the first slot and a third plate adjacent the second plate. The third plate comprises a fifth leg aligned with the first leg, a sixth leg aligned with the second leg, a third slot aligned with the first and second slots, and a second pivot pin opening aligned with the first pivot pin opening. A pivot leg is inserted in a space formed between a front edge of the third leg on the second plate, an inner face of the first leg and the fifth leg of the third plate, the pivot leg having a third pivot opening aligned with the first and second pivot openings. A pivot pin is inserted through the aligned pivot pin openings to pivotally connect the pivot leg to the first plate and the third plate.

According to another aspect, a clamp, comprises a plurality of plates stacked together to form a substantially c-shaped body having an upper leg that is longer than a lower leg, a space in the upper leg for receiving a pivot leg, and a tapering slot separating the upper leg from the lower leg, a pivot leg and a lifting portion. The pivot leg is pivotally mounted in the space in the upper leg and extending down from the upper leg to form a seat comprising a space between the pivot leg and the lower leg and the tapering slot. The lifting portion comprising an opening for connecting the clamp to a machine.

According to another aspect, a method of making a clamp comprises the steps of stacking and securing a plurality of plates together to form a substantially c-shaped body having an upper leg that is longer than a lower leg, a space in the upper leg for receiving a pivot leg, and a tapering slot separating the upper leg from the lower leg, and pivotally attaching a pivot leg to the body using a pivot pin, such that the pivot leg extends down from the upper leg to form a seat comprising a space between the pivot leg and the lower leg and the tapering slot.

BRIEF DESCRIPTION OF THE FIGURES

FIG. 6 is a side view of a middle plate used in the lifting clamp of FIG. 1;

FIG. 7 is a rear view of the exterior plate of FIG. 6;

DETAILED DESCRIPTION

A clamp for lifting an object includes a plurality of stacked plates, a pivoting leg and a lock. The invention will be described below relative to certain illustrative embodiments, though those skilled in the art will recognize that the invention is not limited to the illustrative embodiments.

Figure 1:
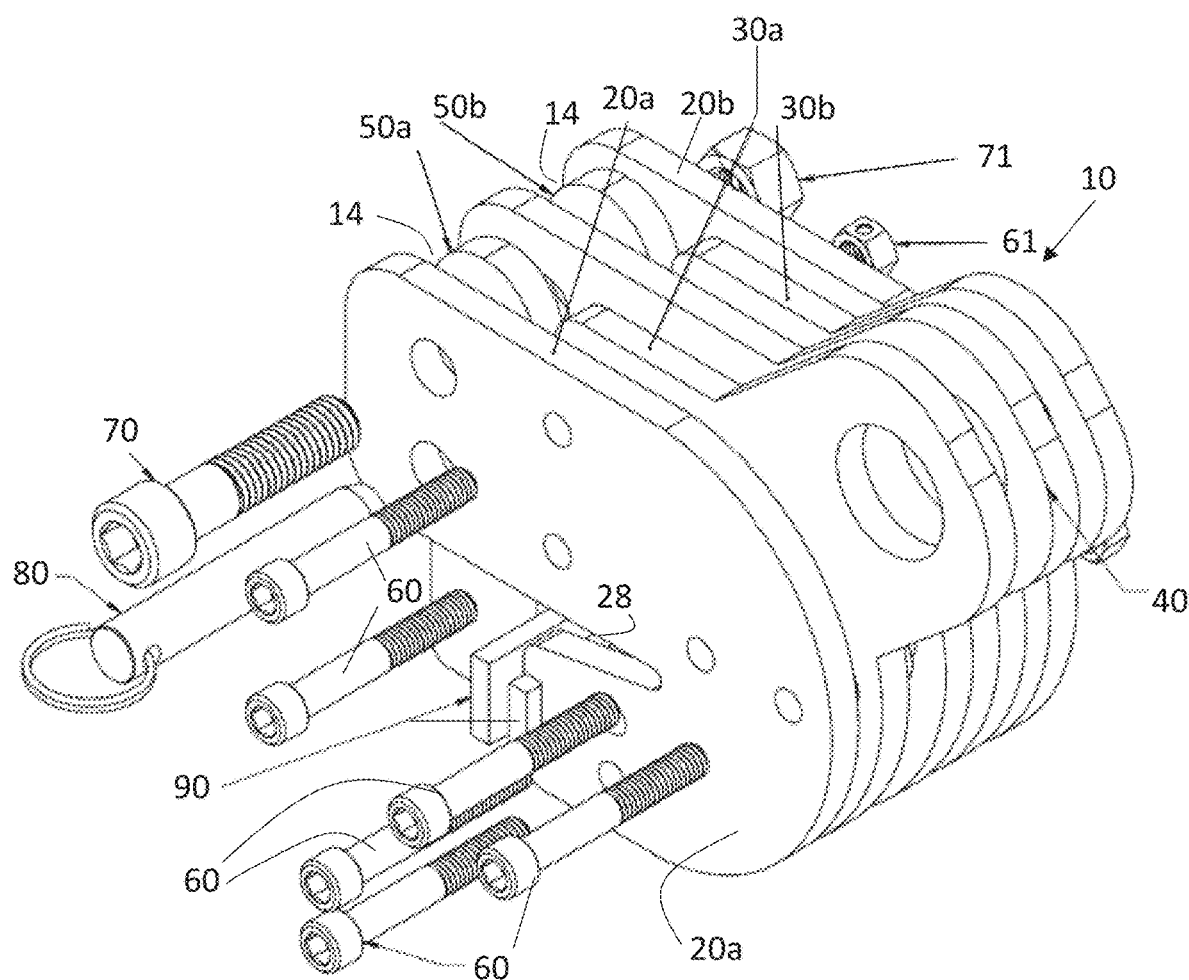
FIG. 1 is an exploded view of a lifting clamp according to an embodiment of the invention.
Figure 2:
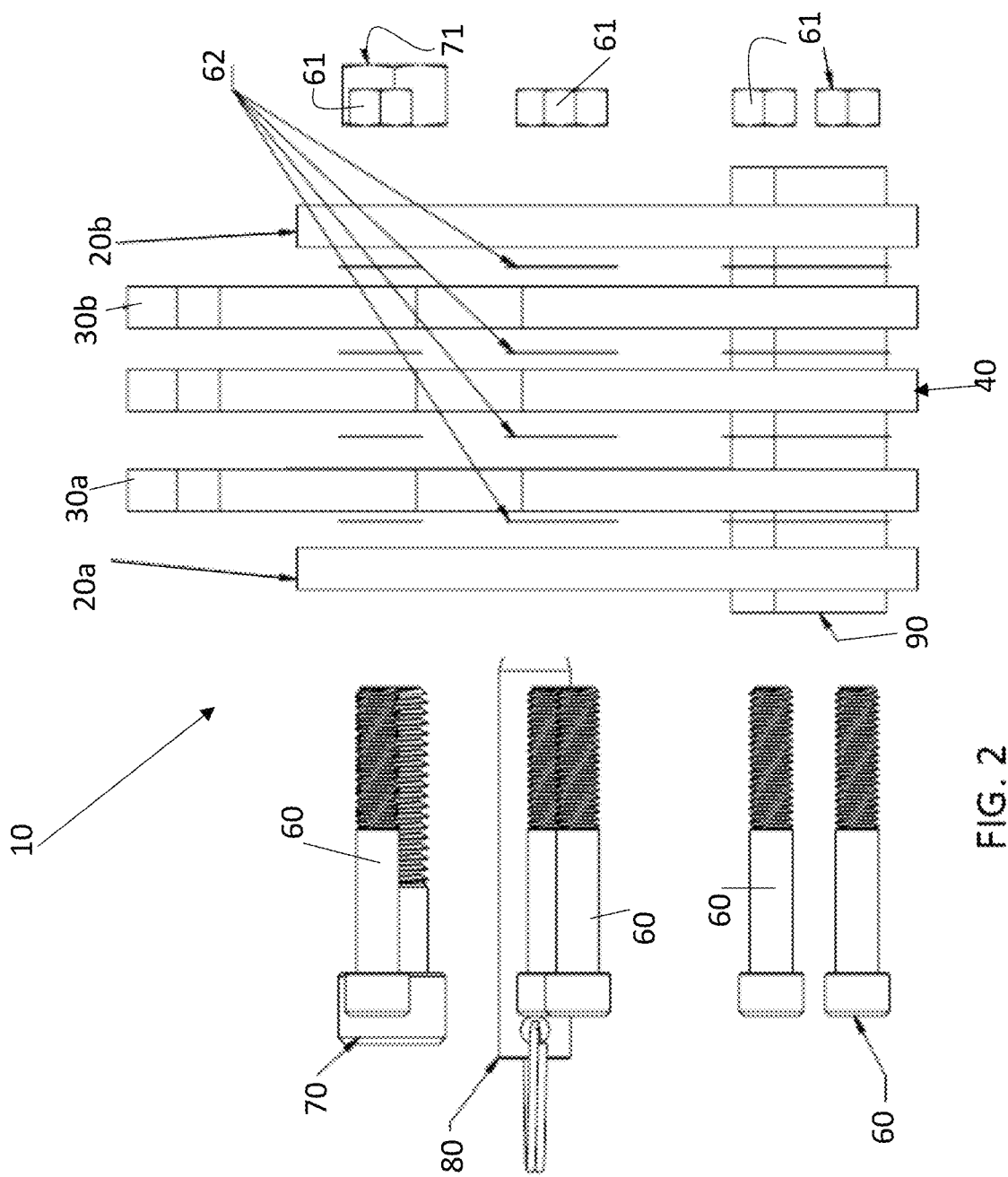
FIG. 2 is a partially exploded rear view of the lifting clamp of FIG. 1.

FIGS. 1 and 2 are partially exploded views of a lifting clamp 10 according to an embodiment of the invention. The illustrative lifting clamp 10 comprises a substantially c-shaped body having a longer upper leg and relatively shorter lower leg. One or more pivot leg are pivotally mounted in one or more spaces in the upper leg to form a seat for an object that extends between the pivot leg and a narrowing slot between the upper and lower legs.

Opposing gripping bars may be attached to the pivot leg and front of the lower leg to facilitate gripping of the object. A locking pin can lock the pivot pin in a locked position or can be removed to allow the seat to open. The illustrative clamp can be used to lift stairs and landings made from channel steel, but the invention is not so limited.

Figure 3:
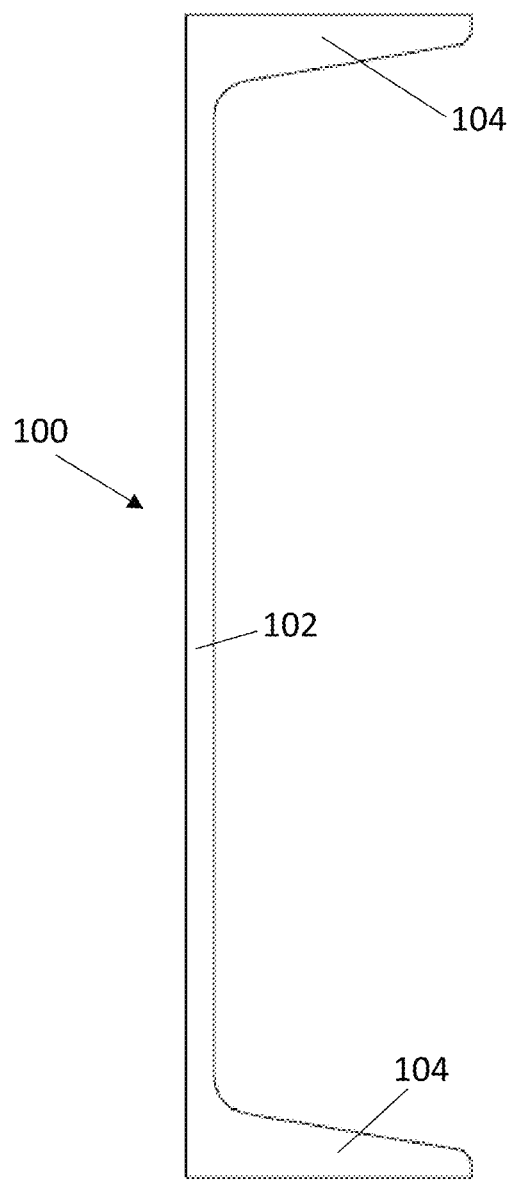
FIG. 3 shows an example of a C-channel suitable for use with the clamp of FIG. 1.

The illustrative body of the lifting clamp 10 is formed of a plurality of plates stacked and secured together to form structure having a lifting portion for connecting to a crane or other machine, a seat for receiving a portion of an object to be lifted and a pivoting portion for selectively opening and locking the seat. In the illustrative embodiment, the plates are machined, cast or otherwise processed from ⅜" thick stainless steel or other suitable stock material. Other suitable means for manufacturing the plates may be used. FIG. 3 shows an embodiment of a C-channel component 100 suitable for lifting with the illustrative lifting clamp 10. The C-channel component comprises a base web 102 and two flange portions 104 extending from the web 102 to form a channel therebetween. The flanges 104 have substantially straight outer walls perpendicular to the web and angled inner walls so that the flange tapers in thickness from the web to the flange tip.

The lifting clamp 10 comprises a pair of substantially C-shaped exterior plates 20a, 20b, a pair of interior plates 30a, 30b adjacent to the interior sides of the exterior plates and a middle plate 40 between the two interior plates. The illustrative stacked plates form an L-shaped seat for receiving a portion of the component to be lifted. The L-shaped seat comprises a first space between gripping bars 90 for receiving a portion of the web 102 and a tapering slot 28 extending perpendicular to the first space for receiving the flange portion 104 of a C-channel component 100. The seat can have any suitable size, shape and configuration depending on the object being clamped.

When stacked together, the middle plate 40 and exterior plates 20a, 20b extend beyond the front of the interior plates 30a, 30b to form a space 14 for pivot legs 50a and 50b. The pivot legs can pivot out to separate the gripping bars 90 and provide access to the slotted opening 28. A plurality of fasteners 60 extending through aligned openings in the plates connects the plates 20, 30, 40 together. A pivot pin 70 extends through aligned openings in the exterior plates 20a, 20b, middle plate 40 and pivot legs 50a, 50b to pivotally connect the pivot legs to the clamp body. The illustrative pivot pin 70 comprises a socket head screw with an associated locknut 71. A locking pin 80 is received in aligned openings in the exterior plates, middle plate and pivot legs to lock the pivot legs 50a, 50b in a locking position so that the gripping bars 90 tightly clamp the component 100. The illustrative locking pin 80 is a quick release pin with a pull ring and deflectable ball detent or button. Any suitable device for selectively locking the pivot legs in place may be used.

The illustrative plate fasteners 60 comprise socket head screws including threaded locknuts 61 for mating with the threads on the screws to secure the fasteners 60 against the clamp. As shown in FIG. 2, round shims 62 can be used at the interior interfaces between the fasteners and plates to facilitate free movement of the pivot plate.

The illustrative gripping bars 90 comprise a pair of opposing flat metal bars, one attached to the interior of the pivot legs, the other seated across lower front edges of the exterior plates 20a, 20b and middle plate 40 to trap a gripped component, preventing the gripped component from escaping the seat. The gripping bars 90 can be welded or otherwise secured into place.

Figure 5:
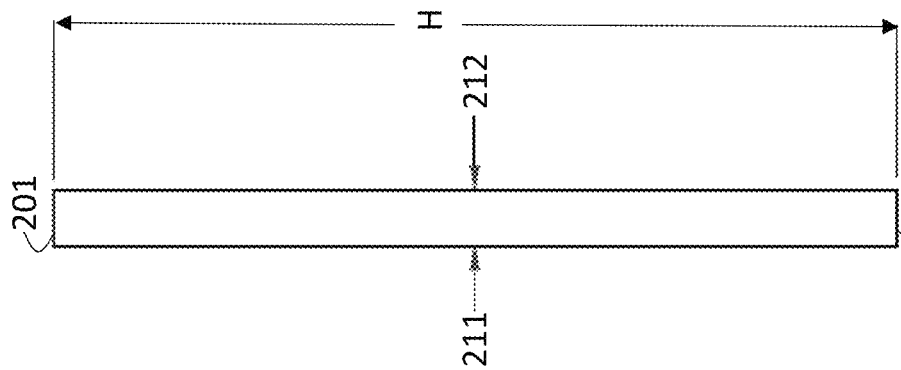
FIG. 5 is a rear view of the exterior plate of FIG. 4.
Figure 4:
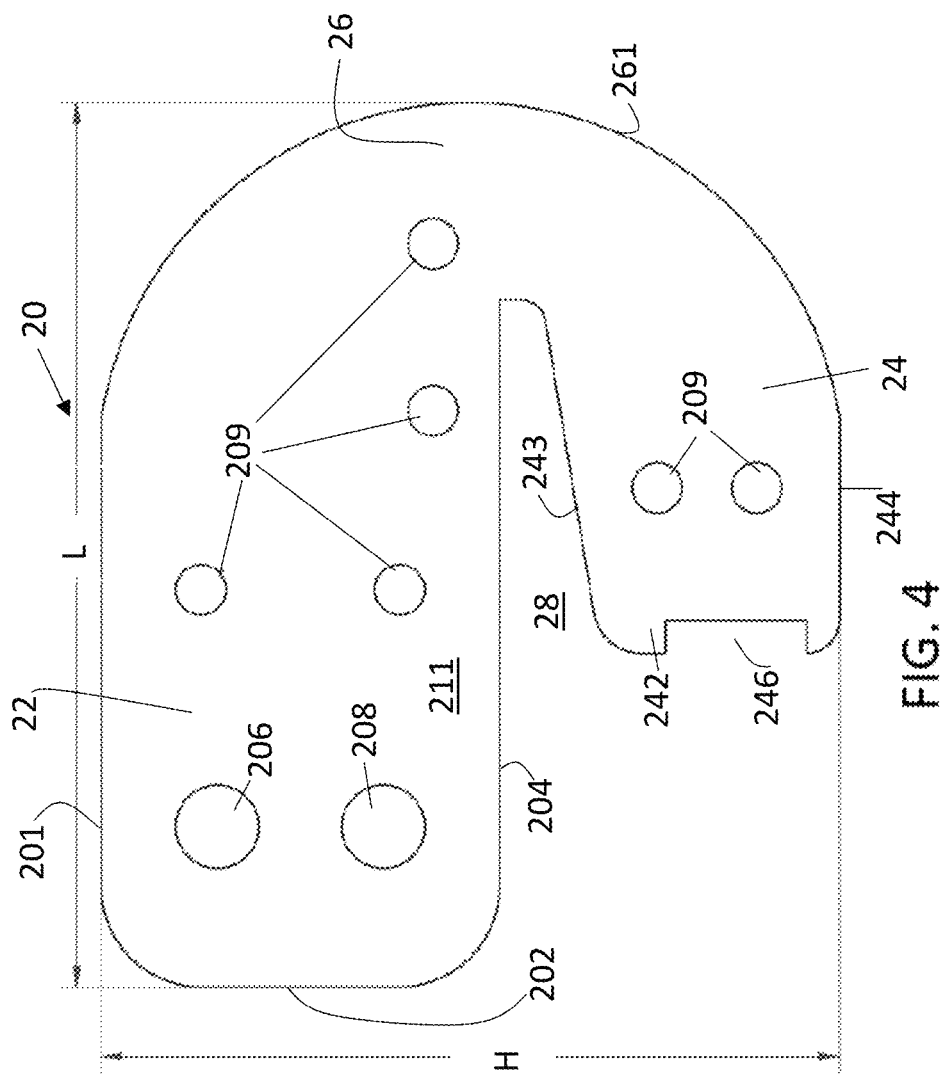
FIG. 4 is a side view of an exterior plate used in the lifting clamp of FIG. 1.

FIGS. 4 and 5 show an embodiment of an exterior plate 20 for the lifting clamp 10 of FIGS. 1 and 2. The illustrative exterior plate 20 is defined by a top leg 22, a lower leg 24 and a connecting portion 26. A tapering slotted opening 28 is formed between the top leg and lower leg. The illustrative tapering slotted opening 28 complements the tapering flange 104 of the C-channel 104, but the opening 28 be vary depending on the object being clamped. The top leg 22 has a substantially straight horizontal top edge 201, a substantially straight vertical upper front edge 202, and a lower edge 204, which is also horizontal and forms the top of the opening 28. A pivot leg opening 206 receives a pivot pin for a pivot leg, and a locking pin opening 208 receives a locking pin for the pivot leg.

The lower leg 24 is defined by a lower front edge 242, a slanted upper edge 243 defining the bottom of the opening 28 and a substantially horizontal bottom edge 244. The edges 204 and 243 cooperate to form the tapering slot for seating the lifted component. The lower front edge 242 includes a recess 246 for seating a gripping bar 90. The lower leg 24 is shorter than the upper leg 22 to accommodate the pivot legs.

The connecting portion 26 of the plate 20 comprises a curved edge 261 extending from the top edge 201 to the lower leg bottom edge 244 and forming the rear edge of the plate 20.

The exterior plate has a height H extending from bottom edge 244 to top edge 201, a length L extending from frontmost edge 202 to the rearmost point of curved edge 261 and thickness T from a first face 211 to a second face 212. As shown, the thickness T is consistent. The plate 20 can be used as either exterior plate 20a or 20b, with the first face 211 forming an interior face for one and an exterior face for the other.

The illustrative plate 20 includes three pairs of fastener openings 209. The lifting clamp is not limited to the illustrative size, number, pattern, configuration, orientation or position of fasteners and fastener openings.

Referring to FIGS. 6 and 7, the middle plate 40 is similar to the exterior plate 20, having an upper leg 42, lower shorter lower leg 44 and connecting portion 46, and further includes a lifting eye portion 420 extending up and at an angle from the rear of the plate. Upper leg 42, shorter lower leg 44, connecting portion 46. The lifting eye portion 420 includes an opening 421 for attaching to a crane or other machine. Edges 401, 402, 404, 443, 442, 444 and 461 align with edges 201, 202, 204, 243, 252, 244 and 261 of the exterior plate 20, and openings 206, 208, 209 align with openings 406, 408, 409. The lower leg front edge 442 includes a recess 446 that aligns with recess 246 for seating a gripping bar 90. The middle plate 40 extends in thickness T from a first face 411 to a second face 412. As shown, the thickness T is consistent and preferably the same thickness as plate 20.

Figure 9:
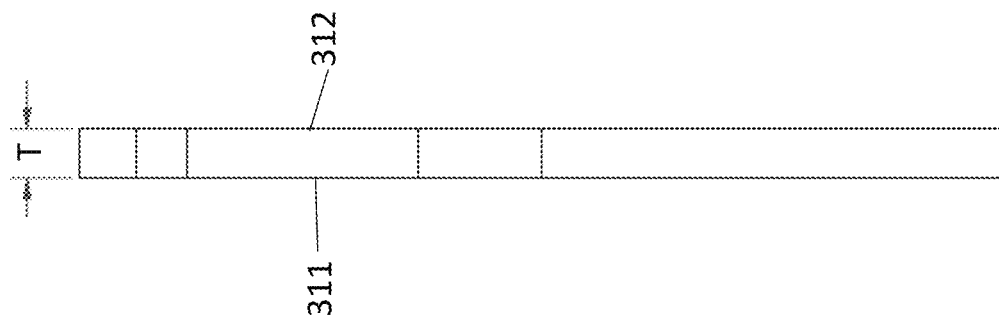
FIG. 9 is a rear view of the interior plate of FIG. 8.
Figure 8:
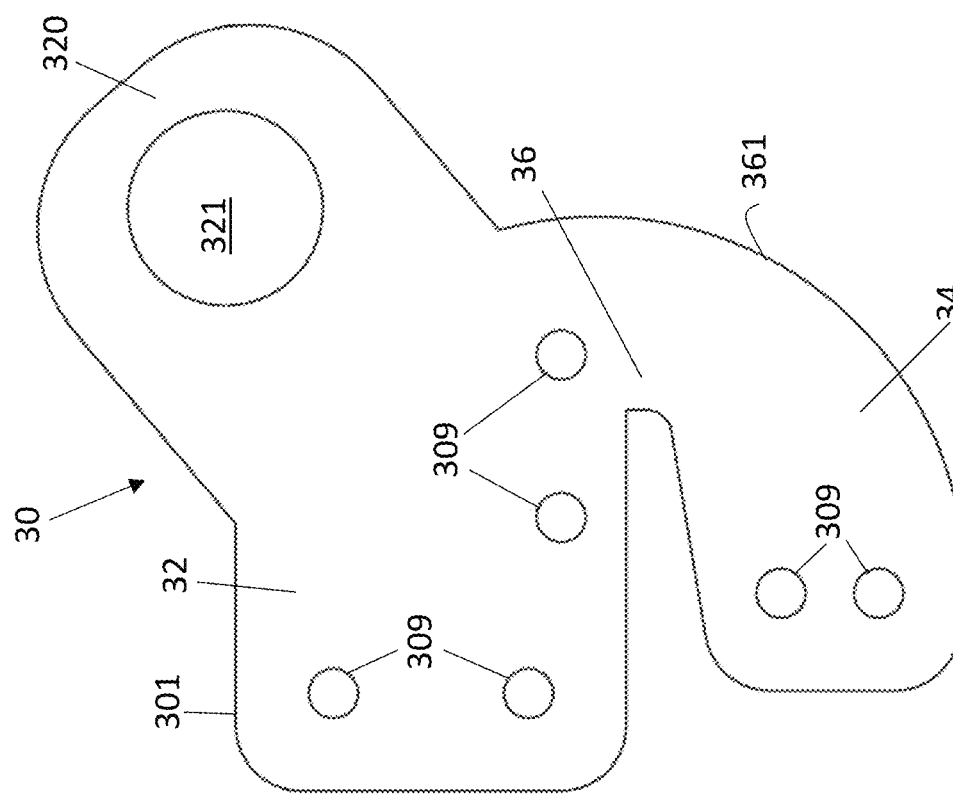
FIG. 8 is a side view of an interior plate used in the lifting clamp of FIG. 1.

FIGS. 8 and 9 show an embodiment of an interior plate 30. The interior plate 30 is also substantially C-shaped with upper leg 32, lower leg 34, connecting portion 36 and a lifting eye portion 320 having an opening 321 that aligns with the lifting eye portion 420 and opening 421 of the middle plate 40. The upper leg of the interior plate 30 is shorter that the upper legs 22, 42 of the middle and exterior plates to form the space 14 (see FIG. 1) for mounting the pivot legs. When the plates are stacked together, front edge 302 is inset from front edges 202 and 402. Top edge 301 aligns with top edges 201, 401, bottom edge 344 aligns with bottom edges 244 and 44 and rear curved edge 361 aligns at least a portion of rear curved edges 261, 461. The interior plate 30 further includes fastener openings 309 that align with fastener openings 209, 409 when the plates 20, 30 and 40 are stacked together. The interior plate 30 extends in thickness T from a first face 311 to a second face 312. As shown, the thickness T is consistent and preferably the same thickness as plates 20 and 40.

Figure 11:
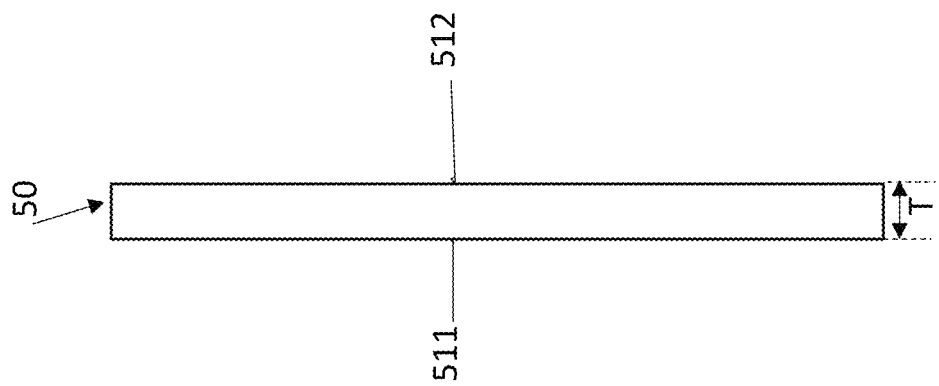
FIG. 11 is a rear view of the pivot leg of FIG. 10.
Figure 10:
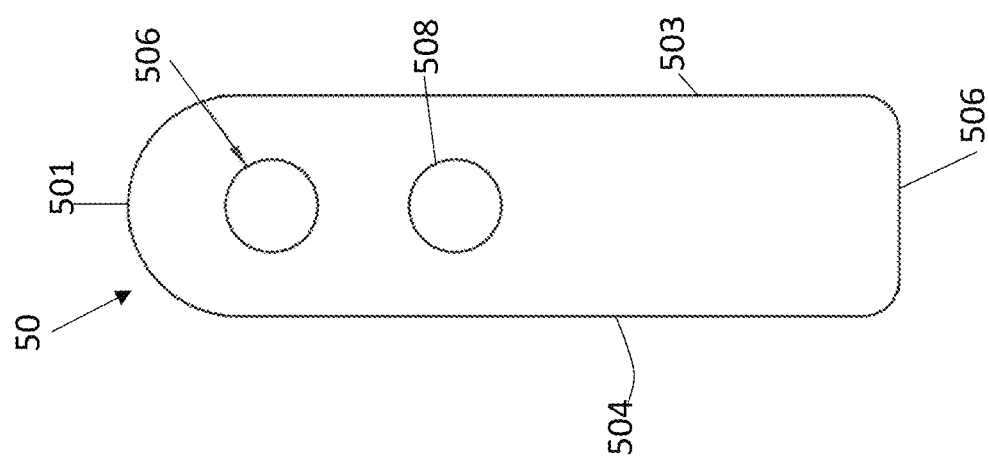
FIG. 10 is a side view of a pivot leg used in the lifting clamp of FIG. 1.

FIGS. 10 and 11 show an embodiment of a pivot leg 50 for the lifting clamp 10. The pivot leg comprises an elongated member designed to fit in a space 14 between the plates 20, 40 and the front edge of the interior plate 30. The illustrative pivot leg 50 has a curved top edge 501, straight, vertical side edges 503, 504 and a straight, horizontal bottom edge 505, but the invention is not so limited. A pivot pin opening 506 aligns with pivot pin openings 206, 406 and a locking pin opening 508 aligns with locking pin openings 208, 408. The pivot leg 50 extends in thickness from a first face 511 to a second face 512. As shown, the thickness T is consistent and preferably the same thickness as plates 20, 30 and 40, though the invention is not so limited. The pivot leg is shorter in height (from bottom edge 506 to the top of edge 501) than the plate 20, so that when assembled, the lower pivot leg edge 506 is above the bottom edges 244, 344 and 444 of the stacked plates 20, 30, 40. A gripping bar 90 can be attached to side edges 503 of the pivot legs 50a, 50b opposite the gripping bar in recesses 246, 446 to grip the web portion of the C-channel.

The clamp 10 can be easily assembled by stacking and fastening the plates 20a, 30a, 40, 30b, 20b together, then inserting and pivotally connecting the pivot legs 50a, 50b to the plates 20a, 40, 20b. The pivot legs 50a, 50b can swing out to open the seat 28 and separate the gripping bars 90, allowing a component to be inserted or removed. Once a component is inserted in the seat 28, the pivot legs can swing in to grip the component, and the pivot lock inserted to lock the pivot legs in a clamping position.

The invention has been described relative to certain illustrative embodiments, though those skilled in the art will recognize that modifications may be made without departing from the scope of the invention.

What is claimed is:

1. A clamp for clamping an object, comprising:
a first plate comprising a first leg, a second leg separated from the first leg by a first slot, a first pivot pin opening in the first leg;
a second plate adjacent an inner face of the first plate, comprising a third leg and a fourth leg separated from the third leg by a second slot that is aligned with the first slot,
a third plate adjacent the second plate, comprising a fifth leg aligned with the first leg, a sixth leg aligned with the second leg, a third slot aligned with the first and second slots, and a second pivot pin opening aligned with the first pivot pin opening;
a pivot leg inserted in a space formed between a front edge of the third leg on the second plate, an inner face of the first leg and the fifth leg of the third plate, the pivot leg having a third pivot opening aligned with the first and second pivot openings; and
a pivot pin inserted through the aligned pivot pin openings to pivotally connect the pivot leg to the first plate and the third plate.

2. The clamp of claim 1, wherein each plate comprises a fastener opening that is aligned with a fastener opening of another plate for receiving a fastener to secure the first, second and third plates together.

3. The clamp of claim 1, wherein the first plate, third plate and pivot leg each includes a pivot lock opening for receiving a locking pin to lock the pivot leg.

4. The clamp of claim 3, further comprising a locking pin inserted in the pivot lock openings to secure the pivot leg in a clamping position.

5. The clamp of claim 1, further comprising a first flat bar extending between front edges of the second leg and the sixth leg and a second flat bar extending across a rear edge of the pivot leg to form a channel substantially perpendicular to the slots.

6. The clamp of claim 1, wherein the first, second and third slots taper.

7. The clamp of claim 1, wherein the second and third plate include aligned lifting portions including aligned openings for connecting the clamp to a machine.

8. The clamp of claim 1, further comprising a fourth plate substantially identical to the second plate and stacked adjacent to the third plate and a fifth plate adjacent to the fourth plate and substantially identical to the first plate.

9. The clamp of claim 1, further comprising a second pivot leg inserted in a space between the third, fourth and fifth plate and having a pivot opening for receiving the pivot pin.

10. The clamp of claim 1, further comprising a first gripping bar mounted on a front edge of the lower leg and a second gripping bar mounted on the pivot leg opposing the first gripping bar to form a portion of the seat.

11. The clamp of claim 10, further comprising a second pivot leg inserted in a second space in the upper leg and connected to the second gripping bar.

12. A clamp, comprising:
a plurality of plates stacked together to form a substantially c-shaped body having an upper leg that is longer than a lower leg, a space in the upper leg for receiving a pivot leg, and a tapering slot separating the upper leg from the lower leg;
a pivot leg pivotally mounted in the space in the upper leg and extending down from the upper leg to form a seat comprising a space between the pivot leg and the lower leg and the tapering slot; and
a lifting portion comprising an opening for connecting the clamp to a machine.

13. The clamp of claim 12, further comprising a lock for locking the pivot leg in a clamped position.

14. A method of making a clamp, comprising the steps of:
stacking and securing a plurality of plates together to form a substantially c-shaped body having an upper leg that is longer than a lower leg, a space in the upper leg for receiving a pivot leg, and a tapering slot separating the upper leg from the lower leg; and
pivotally attaching a pivot leg to the body using a pivot pin, such that the pivot leg extends down from the upper leg to form a seat comprising a space between the pivot leg and the lower leg and the tapering slot.

15. The method of claim 14, further comprising the steps of:
mounting a first gripping bar to a front edge of the lower leg; and
mounting a second gripping bar to the pivot leg opposing the first gripping bar to form a portion of the seat.

16. The method of claim 14, further comprising the step of providing a lock for selectively locking the pivot leg in a clamped position.

* * * * *